United States Patent
Zhao

(10) Patent No.: US 8,583,599 B2
(45) Date of Patent: Nov. 12, 2013

(54) REDUCING DATA DUPLICATION IN CLOUD STORAGE

(75) Inventor: Hui Zhao, Beijing (CN)

(73) Assignee: CA, Inc., Islandia, NY (US)

( * ) Notice: Subject to any disclaimer, the term of this patent is extended or adjusted under 35 U.S.C. 154(b) by 85 days.

(21) Appl. No.: 12/955,648

(22) Filed: Nov. 29, 2010

(65) Prior Publication Data

US 2012/0136834 A1    May 31, 2012

(51) Int. Cl.
    G06F 7/00    (2006.01)
    G06F 17/00    (2006.01)
(52) U.S. Cl.
    USPC ................ 707/649; 707/640; 707/660
(58) Field of Classification Search
    None
    See application file for complete search history.

(56) References Cited

U.S. PATENT DOCUMENTS

| | | | |
|---|---|---|---|
| 6,202,063 B1* | 3/2001 | Benedikt et al. | 707/765 |
| 2006/0129875 A1* | 6/2006 | Barrall | 714/6 |
| 2010/0257142 A1* | 10/2010 | Murphy et al. | 707/681 |
| 2010/0318812 A1* | 12/2010 | Auradkar et al. | 713/193 |
| 2010/0332549 A1* | 12/2010 | Nichols et al. | 707/802 |
| 2010/0333116 A1* | 12/2010 | Prahlad et al. | 719/328 |
| 2011/0161339 A1* | 6/2011 | Ireland et al. | 707/759 |
| 2011/0167221 A1* | 7/2011 | Pangal et al. | 711/117 |
| 2012/0042162 A1* | 2/2012 | Anglin et al. | 713/165 |

* cited by examiner

*Primary Examiner* — Wilson Lee
*Assistant Examiner* — Jessica N Le
(74) *Attorney, Agent, or Firm* — Pillsbury Winthrop Shaw Pittman LLP

(57) ABSTRACT

Data duplication may be reduced in cloud storage. First snapshots of one or more remote volumes may be received via a network. Responsive to and/or based on the first snapshots, unique clusters and duplicate clusters may be identified among the valid clusters of the remote volumes. The unique clusters and single instances of the duplicate clusters may be stored in a backup file, such that the backup file is devoid of duplicate clusters. Second snapshots of the one or more remote volumes may be received via the network. Responsive to the second snapshots, the clusters in the backup file that are no longer valid may be utilized to store the valid clusters in the one or more remote volumes not yet stored in the backup file.

22 Claims, 5 Drawing Sheets

REDUCING DATA DUPLICATION IN CLOUD STORAGE

FIELD OF THE INVENTION

The invention relates to reducing data duplication in cloud storage.

BACKGROUND OF THE INVENTION

Cloud storage describes Internet-based data storage, whereby shared storage resources are provided to networked computers and other devices. Generally speaking, cloud storage can make data more available and reliable relative to local storage approaches. One benefit of cloud storage from the standpoint of a user is the lack of storage space limitations. From the standpoint of a cloud storage provider, however, storing duplicate data increases the cost of mass data storage. As such, it is desirable to reduce duplicate data in cloud storage. In addition to the cost of mass data storage, storage of data in cloud storage generally needs to be more efficient than storage of data locally due to data transmission rates across the Internet.

SUMMARY

One aspect of the invention relates to a cloud storage system. The cloud storage system may be coupled with one or more computing devices via a network. The cloud storage system may allow the computing devices to store and retrieve data (e.g., backup data, application data, etc.) remotely via the network. The cloud storage system may eliminate or reduce duplicate data received from the computing devices and stored by the cloud storage system. In some implementations, data clusters associated with a single backup file stored by the cloud storage system may be utilized to represent data stored from one or more data volumes of one or more remote computing devices. Among other features, by identifying duplicate clusters included in the one or more data volumes of the one or more remote computing devices, the cloud storage system can store one copy of those duplicate clusters in the single backup file thereby reducing duplicate data. The cloud storage system may include electronic storage, a processor, and/or other components.

According to various implementations, the electronic storage may comprise electronic storage media that electronically stores information. The electronic storage media of the electronic storage may include system storage that is provided integrally (i.e., substantially non-removable) with the cloud storage system and/or removable storage that is removably connectable to the cloud storage system. The electronic storage may store software algorithms, information determined by the processor and/or other information that enables the cloud storage system to function as described herein.

The processor may be configured to provide information processing capabilities in the cloud storage system. As such, the processor may be configured to execute one or more computer program modules. The one or more computer program modules may include one or more of a snapshot retrieval module, a cluster identification module, a mapping module, a backup module, and/or other modules.

The snapshot retrieval module may be configured to receive snapshots of one or more remote volumes via the network. The remote volumes may be data volumes of the computing devices coupled with the cloud storage system via the network. The snapshots may be copies of the one or more remote volumes at a given instant in time. Individual ones of the one or more remote volumes may include a plurality of clusters. Individual ones of the plurality of clusters may be identified as valid or invalid. Valid clusters may contain data to be backed up. Invalid clusters may be devoid of data to be backed up. The snapshot retrieval module may receive snapshots at successive instants in time. For example, the snapshot retrieval module may receive snapshots from one or more of the computing devices at a first instant in time, a second instant in time, a third instant in time, and so forth, wherein the third instant in time is after the second instant in time, which is after the first instant in time. Retrieval of snapshots from the computing devices may be automatic or may be triggered by an event. Such trigger events may, for example, include an action by a user of one of the computing devices, a preset time, and/or other trigger event.

The cluster identification module may be configured to identify and/or determine various aspects of individual clusters included in the snapshots received by the snapshot retrieval module. Such identification and/or determination may be responsive to receipt of snapshots by the snapshot retrieval module. In some implementations, the cluster identification module may be configured to identify unique clusters and duplicate clusters among valid clusters included in snapshots. A unique cluster is a valid cluster that is not the same as any other valid cluster. A duplicate cluster is a valid cluster that is the same as one or more other valid clusters.

According to exemplary implementations, the cluster identification module may be configured to identify duplicate clusters by determining hash values for individual ones of the valid clusters. A hash value for a given cluster may be determined by applying a hash function to the data contained in that cluster. A hash function is any well-defined procedure or mathematical function that converts a specified amount of data (e.g., a cluster and/or other unit of data), which may be relatively large and/or variable-sized, into a small datum. Such a datum may include a single integer, sequence of integers, and/or other small datum that may serve as an index or a unique identifier for the specific data set to which the hash function was applied. The values returned by a hash function may be referred to as hash values, hash codes, hash sums, checksums, and/or hashes. Hash functions may be implemented to speed up table lookup or data comparison tasks such as, for example, locating items in a database, detecting duplicated data, and/or other tasks. As such, valid clusters having identical hash values may be identified as duplicate clusters. The cluster identification module may utilize one or more dynamic multilevel indexes to manage hash values for a data store. In some implementations, a dynamic multilevel index may include a B+ tree. The cluster identification module may be further configured to store the hash values in an index file.

The mapping module may be configured to generate and/or manage map files for the volumes included in the computing devices. In some implementations, an individual map file may be associated with individual volumes. A new map file may be generated each time a snapshot is received, in accordance with various implementations. The map files may be indicative of valid and invalid clusters. In some implementations, the mapping module may be configured to record, in a map file associated with a given remote volume, identifiers associated with individual ones of the plurality of clusters included in the given remote volume. The sequence of the identifiers in the map file may correspond to the sequence of the associated clusters in the given remote volume. Identifiers associated with valid clusters may be assigned incrementally increasing values along the map file. Identifiers associated with invalid clusters being assigned a static value. The map file associated with the given remote volume may have the same number of units as the number of clusters in the given remote volume. The mapping module may be further configured to update the map file responsive to identification of the duplicate clusters such that identifiers in the map file that are associated with duplicate clusters are assigned the same value. According to some implementations, the mapping module may be configured to compress the map file. The mapping module may be configured to reconstruct a remote volume associated with a given snapshot of that remote volume from a backup file based on a map file associated with the given snapshot.

The backup module may be configured to store data received from the computing devices in the electronic storage. In exemplary implementations, the backup module is configured to store, in a backup file, unique clusters and single instances of duplicate clusters received from one or more of the computing devices via the network. As such, the backup file may be devoid of duplicate clusters, but will still include a copy of each cluster included in the snapshots received by the snapshot retrieval module. According to some implementations, the backup module may be further configured to utilize clusters in the backup file that were previously stored, but are no longer valid or useful, to store newly received valid clusters that are not yet stored in the backup file.

Another aspect of the invention relates to a method for reducing data duplication in cloud storage. At one operation, first snapshots of one or more remote volumes are received via a network. The first snapshots may be copies of the one or more remote volumes at a first instant in time. Individual ones of the one or more remote volumes may include a plurality of clusters. Individual ones of the plurality of clusters may be identified as valid or invalid, wherein valid clusters contain data to be backed up and invalid clusters are devoid of data to be backed up. This operation may be performed by way of execution of the snapshot retrieval module.

At another operation, unique clusters and duplicate clusters are identified among the valid clusters. The duplicate clusters may be valid clusters in the one or remote volumes containing identical data. Duplicate clusters may be identified by determining hash values for individual ones of valid clusters where valid clusters having identical hash values may be identified as duplicate clusters. This operation may be performed responsive to and/or based on the first snapshots. The cluster identification module may be executed to perform this operation.

At yet another operation, identifiers associated with individual ones of the plurality of clusters included in the given remote volume may be recorded, such as in a map file associated with a given remote volume. The sequence of the identifiers in the map file may correspond to the sequence of the associated clusters in the given remote volume. Identifiers associated with valid clusters may be assigned incrementally increasing values along the map file. Identifiers associated with invalid clusters being assigned a static value. In some implementations, the map file may be updated responsive to identification of duplicate clusters such that identifiers in the map file that are associated with duplicate clusters are assigned the same value. The map file may be compressed. The mapping module may be executed to perform this operation in accordance with exemplary implementations.

At still another operation, the unique clusters and single instances of the duplicate clusters are stored in a backup file such that the backup file is devoid of duplicate clusters. This operation may be performed via execution of the backup module.

At a further operation, second snapshots of the one or more remote volumes are received via the network. The second snapshots may be copies of the one or more remote volumes at a second instant in time. The second instant in time may be after the first instant in time. The snapshot retrieval module may be executed to perform this operation.

At a yet further operation, valid clusters in the one or more remote volumes not yet stored in the backup file and clusters in the backup file that are no longer valid are identified. Performance of this operation may be responsive to and/or based on the second snapshots. The cluster identification module may be executed to perform this operation in some implementations.

At a still further operation, the clusters in the backup file that are no longer valid or useful may be utilized to store the valid clusters in the one or more remote volumes that have not yet been stored in the backup file. This operation may be performed responsive to the second snapshots and/or through execution of the backup module in some implementations.

The method may include further operations performed on snapshots received after the first and second snapshots. For example, the method may further include receiving third snapshots of the one or more remote volumes via the network, the third snapshots being copies of the one or more remote volumes at a third instant in time, wherein the third instant in time is after the second instant in time. Responsive to and/or based on the third snapshots, valid clusters may be identified in the one or more remote volumes that have not yet been stored in the backup file as well as clusters in the backup file that are no longer valid. Responsive to the third snapshots, the clusters in the backup file that are no longer valid may be utilized to store the valid clusters in the one or more remote volumes not yet stored in the backup file.

These and other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION OF THE INVENTION

Figure 1:
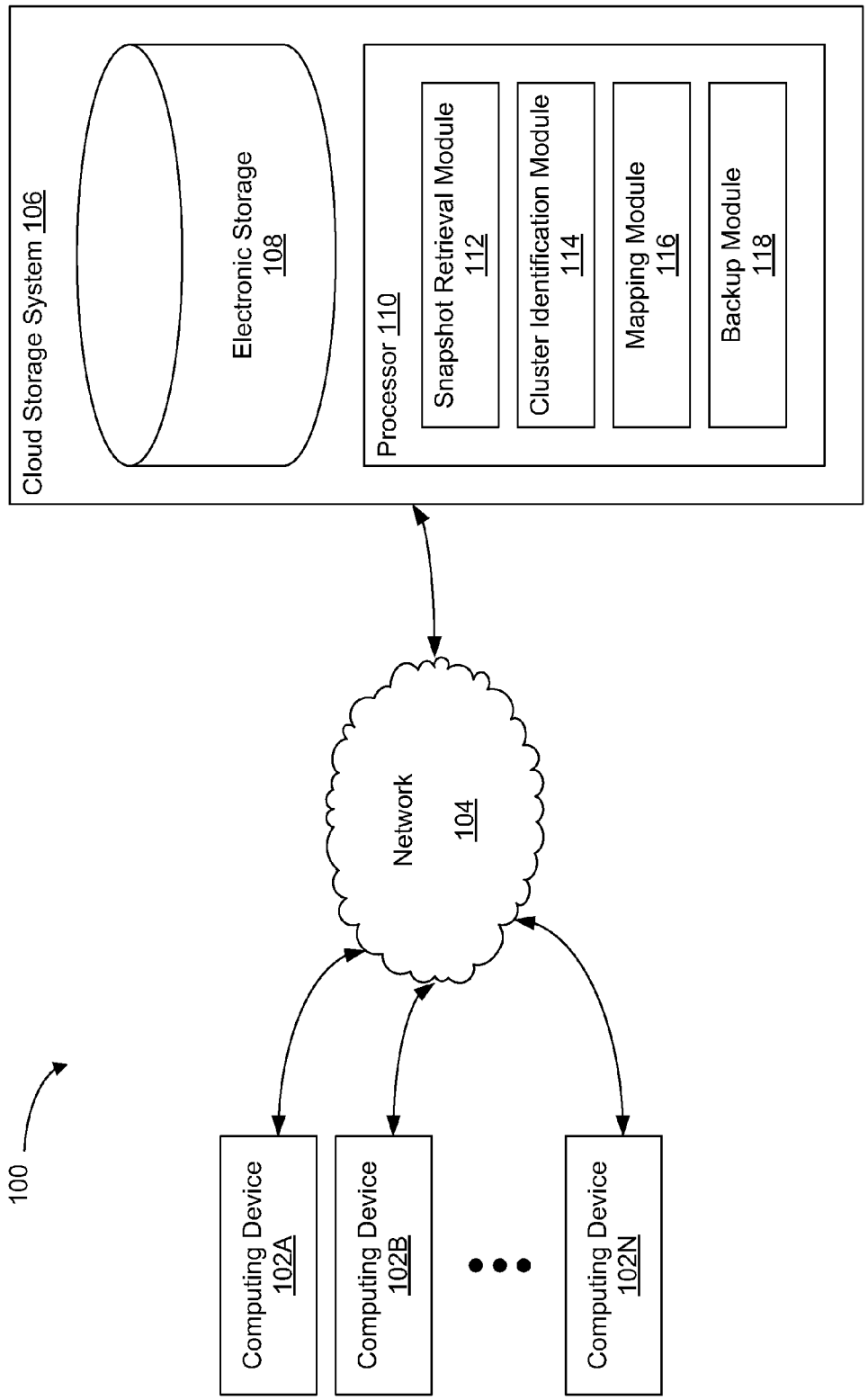
FIG. 1 illustrates an example of an environment in which implementations of the present invention may be practiced.

FIG. 1 illustrates an example of an environment 100 in which implementations of the present invention may be practiced. As depicted in FIG. 1, the environment 100 includes computing devices 102A-102N communicatively coupled, via a network 104, with a cloud storage system 106. The cloud storage system 106 may allow the computing devices 102A-102N to store and retrieve data (e.g., backup data, application data, etc.) remotely via the network 104. The cloud storage system 106 may eliminate or reduce duplicate data received from the computing devices 102A-102N and stored by the cloud storage system 106. In some implementations, data clusters associated with a single backup file stored by the cloud storage system 106 may be utilized to represent data stored from one or more data volumes of one or more remote computing devices (e.g., the computing devices 102A-102N). Among other features, by identifying duplicate clusters included in the one or more data volumes of the one or more remote computing devices, the cloud storage system 106 can store one copy of those duplicate clusters in the single backup file thereby reducing duplicate data.

Although FIG. 1 depicts computing device 102A, computing device 102B, and computing device 102N, some implementations may include any number of such computing devices. The computing devices 102A-102N may include any type of device having computing capabilities. By was of non-limiting example, the computing devices 102A-102N may include personal computers, laptops, servers, personal digital assistances, Smart phones, and/or any other computing device. The computing devices 102A-102N may include various components (not depicted in FIG. 1) that are not necessary to describe implementations of the present invention such as user interfaces, processors, local storage systems, and so forth.

The network 104 may include the Internet and/or other networks. It will be appreciated that this is not intended to be limiting, and that the scope of this disclosure includes implementations in which computing devices 102A-102N and the cloud storage system 106 are operatively linked via some other communication media.

As mentioned, the cloud storage system 106 may allow the computing devices 102A-102N to store and retrieve data (e.g., backup data, application data, etc.) remotely via the network 104. The cloud storage system 106 may eliminate or reduce duplicate data received from the computing devices 102A-102N and stored by the cloud storage system 106. According to various implementations, the cloud storage system 106 may be a single entity, or may be distributed and operate as a coordination of several entities communicatively coupled by way of the network 104. For illustrative purposes, and as depicted in FIG. 1, the cloud storage system 106 may include electronic storage 108 and processor 110.

According to various implementations, the electronic storage 108 may comprise electronic storage media that electronically stores information. The electronic storage media of the electronic storage 108 may include system storage that is provided integrally (i.e., substantially non-removable) with the cloud storage system 106 and/or removable storage that is removably connectable to the cloud storage system 106 via, for example, a port (e.g., a USB port, a firewire port, etc.) or a drive (e.g., a disk drive, etc.). The electronic storage 108 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 108 may store software algorithms, information determined by the processor 110 and/or other information that enables the cloud storage system 106 to function as described herein. The electronic storage 108 may be a separate component within the cloud storage system 106, or the electronic storage 108 may be provided integrally with one or more other components of the cloud storage system 106 (e.g., the processor 110).

The processor 110 may be configured to provide information processing capabilities in the cloud storage system 106. As such, the processor 110 may include one or more of a digital processor, an analog processor, a digital circuit designed to process information, an analog circuit designed to process information, a state machine, and/or other mechanisms for electronically processing information. Although the processor 110 is shown in FIG. 1 as a single entity, this is for illustrative purposes only. In some implementations, the processor 110 may include a plurality of processing units. These processing units may be physically located within the same device or computing platform, or the processor 110 may represent processing functionality of a plurality of devices operating in coordination.

As is shown in FIG. 1, the processor 110 may be configured to execute one or more computer program modules. The one or more computer program modules may include one or more of a snapshot retrieval module 112, a cluster identification module 114, a mapping module 116, a backup module 118, and/or other modules. The processor 110 may be configured to execute the modules 112, 114, 116, and/or 118 by software; hardware; firmware; some combination of software, hardware, and/or firmware; and/or other mechanisms for configuring processing capabilities on the processor 110.

It should be appreciated that although the modules 112, 114, 116, and 118 are illustrated in FIG. 1 as being co-located within a single processing unit, in implementations in which the processor 110 includes multiple processing units, one or more of the modules 112, 114, 116, and/or 118 may be located remotely from the other modules. The description of the functionality provided by the different modules 112, 114, 116, and/or 118 described below is for illustrative purposes, and is not intended to be limiting, as any of the modules 112, 114, 116, and/or 118 may provide more or less functionality than is described. For example, one or more of the modules 112, 114, 116, and/or 118 may be eliminated, and some or all of its functionality may be provided by other ones of the modules 112, 114, 116, and/or 118. As another example, the processor 108 may be configured to execute one or more additional modules that may perform some or all of the functionality attributed below to one of the modules 112, 114, 116, and/or 118.

The snapshot retrieval module 112 may be configured to receive snapshots of one or more remote volumes via the network 104. The remote volumes may be data volumes of the computing devices 102A-102N. The snapshots may be copies of the one or more remote volumes at a given instant in time. Individual ones of the one or more remote volumes may include a plurality of clusters. Individual ones of the plurality of clusters may be identified as valid or invalid. Valid clusters may contain data to be backed up. Invalid clusters may be devoid of data to be backed up. The snapshot retrieval module 112 may receive snapshots at successive instants in time. For example, the snapshot retrieval module 112 may receive snapshots from one or more of the computing devices 102A-102N at a first instant in time, a second instant in time, a third instant in time, and so forth, wherein the third instant in time is after the second instant in time, which is after the first instant in time. Retrieval of snapshots from the computing devices 102A-102N may be automatic or may be triggered by an event. Such trigger events may, for example, include an action by a user of one of the computing devices 102A-102N, a preset time, and/or other trigger event. The snapshot retrieval module 112 is described further by way of one or more of the implementation examples provided in connection with FIG. 2, FIG. 3, and/or FIG. 4.

The cluster identification module 114 may be configured to identify and/or determine various aspects of individual clusters included in the snapshots received by the snapshot retrieval module 112. Such identification and/or determination may be responsive to receipt of snapshots by the snapshot retrieval module 112. In some implementations, the cluster identification module 114 may be configured to identify unique clusters and duplicate clusters among valid clusters included in snapshots. A unique cluster is a valid cluster that is not the same as any other valid cluster. A duplicate cluster is a valid cluster that is the same as one or more other valid clusters.

According to exemplary implementations, the cluster identification module 114 may be configured to identify duplicate clusters by determining hash values for individual ones of the valid clusters. A hash value for a given cluster may be determined by applying a hash function to the data contained in that cluster. A hash function is any well-defined procedure or mathematical function that converts a specified amount of data (e.g., a cluster and/or other unit of data), which may be relatively large and/or variable-sized, into a small datum. Such a datum may include a single integer, sequence of integers, and/or other small datum that may serve as an index or a unique identifier for the specific data set to which the hash function was applied. The values returned by a hash function may be referred to as hash values, hash codes, hash sums, checksums, and/or hashes. Hash functions may be implemented to speed up table lookup or data comparison tasks such as, for example, locating items in a database, detecting duplicated data, and/or other tasks. As such, valid clusters having identical hash values may be identified as duplicate clusters. The cluster identification module 114 may utilize one or more dynamic multilevel indexes to manage hash values for a data store. In some implementations, a dynamic multilevel index may include a B+ tree. The cluster identification module 114 may be further configured to store the hash values in an index file. The cluster identification module 114 is described further by way of one or more of the implementation examples provided in connection with FIG. 2, FIG. 3, and/or FIG. 4.

The mapping module 116 may be configured to generate and/or manage map files for the volumes included in the computing devices 102A-102N. In some implementations, an individual map file may be associated with individual volumes. A new map file may be generated each time a snapshot is received, in accordance with various implementations. The map files may be indicative of valid and invalid clusters. In some implementations, the mapping module 116 may be configured to record, in a map file associated with a given remote volume, identifiers associated with individual ones of the plurality of clusters included in the given remote volume. The sequence of the identifiers in the map file may correspond to the sequence of the associated clusters in the given remote volume. Identifiers associated with valid clusters may be assigned incrementally increasing values along the map file. Identifiers associated with invalid clusters being assigned a static value. The map file associated with the given remote volume may have the same number of units as the number of clusters in the given remote volume. The mapping module 116 may be further configured to update the map file responsive to identification of the duplicate clusters such that identifiers in the map file that are associated with duplicate clusters are assigned the same value. According to some implementations, the mapping module 116 may be configured to compress the map file. The mapping module 116 may be configured to reconstruct a remote volume associated with a given snapshot of that remote volume from a backup file based on a map file associated with the given snapshot. The mapping module 116 is described further by way of one or more of the implementation examples provided in connection with FIG. 2, FIG. 3, and/or FIG. 4.

The backup module 118 may be configured to store data received from the computing devices 102A-102N in the electronic storage 108. In exemplary implementations, the backup module 118 is configured to store, in a backup file, unique clusters and single instances of duplicate clusters received from one or more of the computing devices 102A-102N via the network 104. As such, the backup file may be devoid of duplicate clusters, but will still include a copy of each cluster included in the snapshots received by the snapshot retrieval module 112. According to some implementations, the backup module 118 may be further configured to utilize clusters in the backup file that were previously stored, but are no longer valid or useful, to store newly received valid clusters that are not yet stored in the backup file. The backup module 118 is described further by way of one or more of the implementation examples provided in connection with FIG. 2, FIG. 3, and/or FIG. 4.

Figure 2:
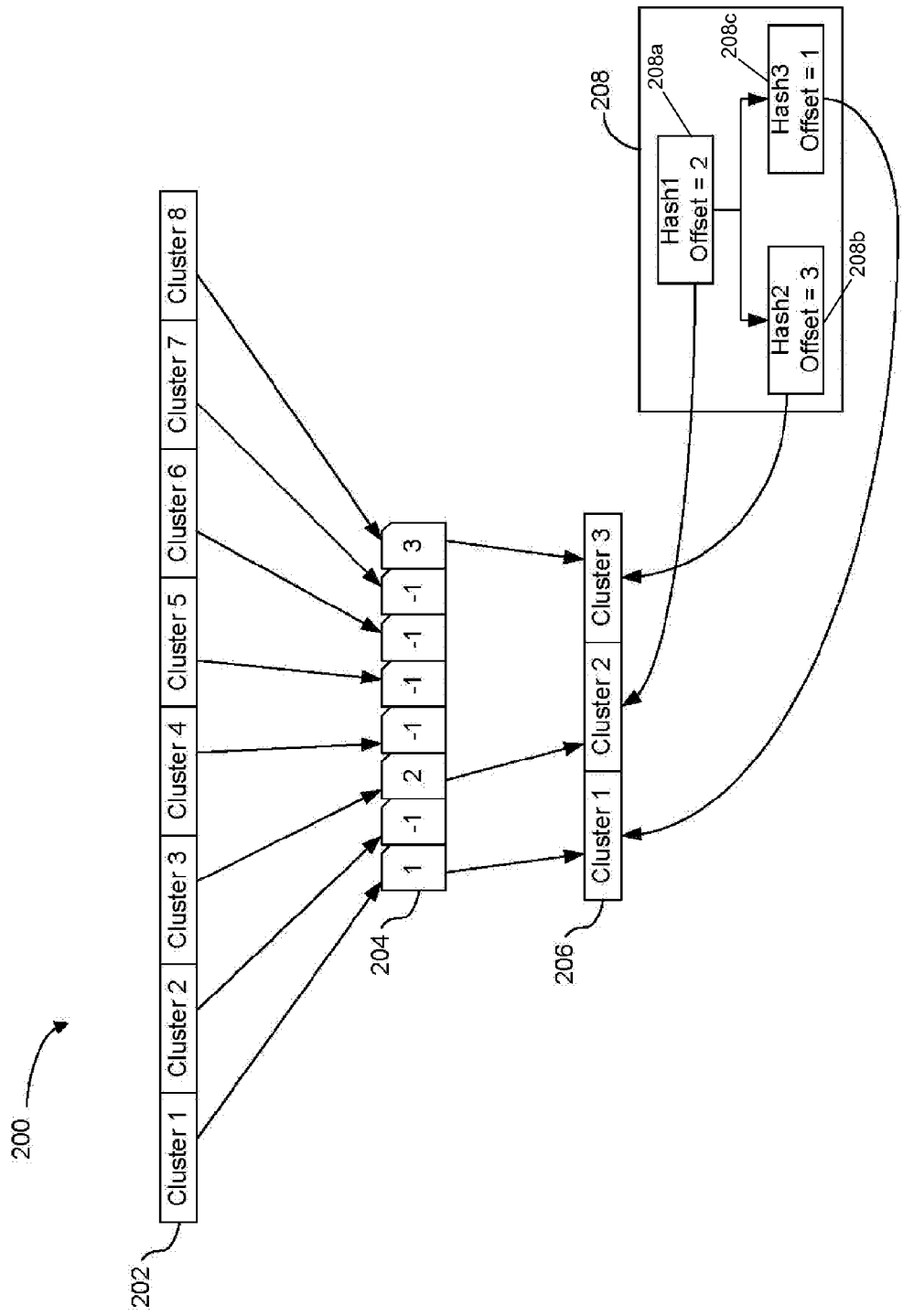
FIG. 2 illustrates an example of reduction of duplicate data according to various implementations of the present invention.

FIG. 2 illustrates a first example 200 of reducing duplicate data according to various implementations of the present invention. The data structures and processes included in the example 200 are illustrative of exemplary implementations and are not intended to be limiting. The example 200 depicts a snapshot 202 of a remote volume. The snapshot 202 may be received from one of the computing devices 102A-102N by the snapshot retrieval module 112. The snapshot 202 includes eight clusters (i.e., cluster 1-cluster 8). Assuming a volume size of 32 kilobytes, each of the eight clusters in the snapshot 202 have a size of 4 kilobytes. Cluster 1, cluster 3, and cluster 8 of the snapshot 202 include useful data, and thus are considered valid clusters. Cluster 2, cluster 4, cluster 5, cluster 6, and cluster 7 do not include useful data, and thus are considered invalid clusters. The valid or invalid status of the individual clusters in the snapshot 202 may be assessed by the cluster identification module 114.

The mapping module 116 may be invoked to map the snapshot 202 into a map file 204. In the example 200, the map file 202 contains the same number of memory units (eight) as the number of clusters contained in the snapshot 202. The sequence of the clusters in the snapshot 202 may correspond to the sequence of the memory units of the map file 204. Each memory unit of the map file 204 includes an identifier corresponding to a cluster in the snapshot 202. The invalid clusters of the snapshot 202 (i.e., clusters 2 and 4-7) are assigned a static value of −1 (negative one). The valid clusters of the snapshot 202 are assigned incrementally increasing values along the map file 204, such that cluster 1 corresponds to an identifier value of 1, cluster 3 corresponds to an identifier value of 2, and cluster 8 corresponds to an identifier value of 3.

The identifiers included in the map file 204 may be used as offset values by the backup module 118 while storing valid clusters of the snapshot 202 in a backup file 206. As such, cluster 1, cluster 2, and cluster 3 of the backup file 206 correspond, respectively, to cluster 1, cluster 3, and cluster 8 of the snapshot 202. The backup file 206 in the example 200 has a size of 12 kilobytes. The mapping module 116 may be utilized to reconstruct the remote volume associated with the snapshot 202 from the backup file 206 based on the map file 204.

As mentioned, the cluster identification module 114 may be utilized to determine unique and duplicate clusters among the valid clusters of the snapshot 202. In exemplary implementations, such a determination may be accomplished by hashing the valid clusters of the snapshot 202. A B+ tree 208 (depicted as including elements 208a, 208b, and 208c) may be used to hash clusters. A valid cluster having a unique hash value may be deemed as unique cluster. A valid cluster having the same hash value as one or more clusters may be identified as a duplicate cluster. Hash values and corresponding offset values may be stored in an index file. In the example 200, each of the valid clusters (i.e., clusters 1, 3, and 8) are unique.

Figure 3:
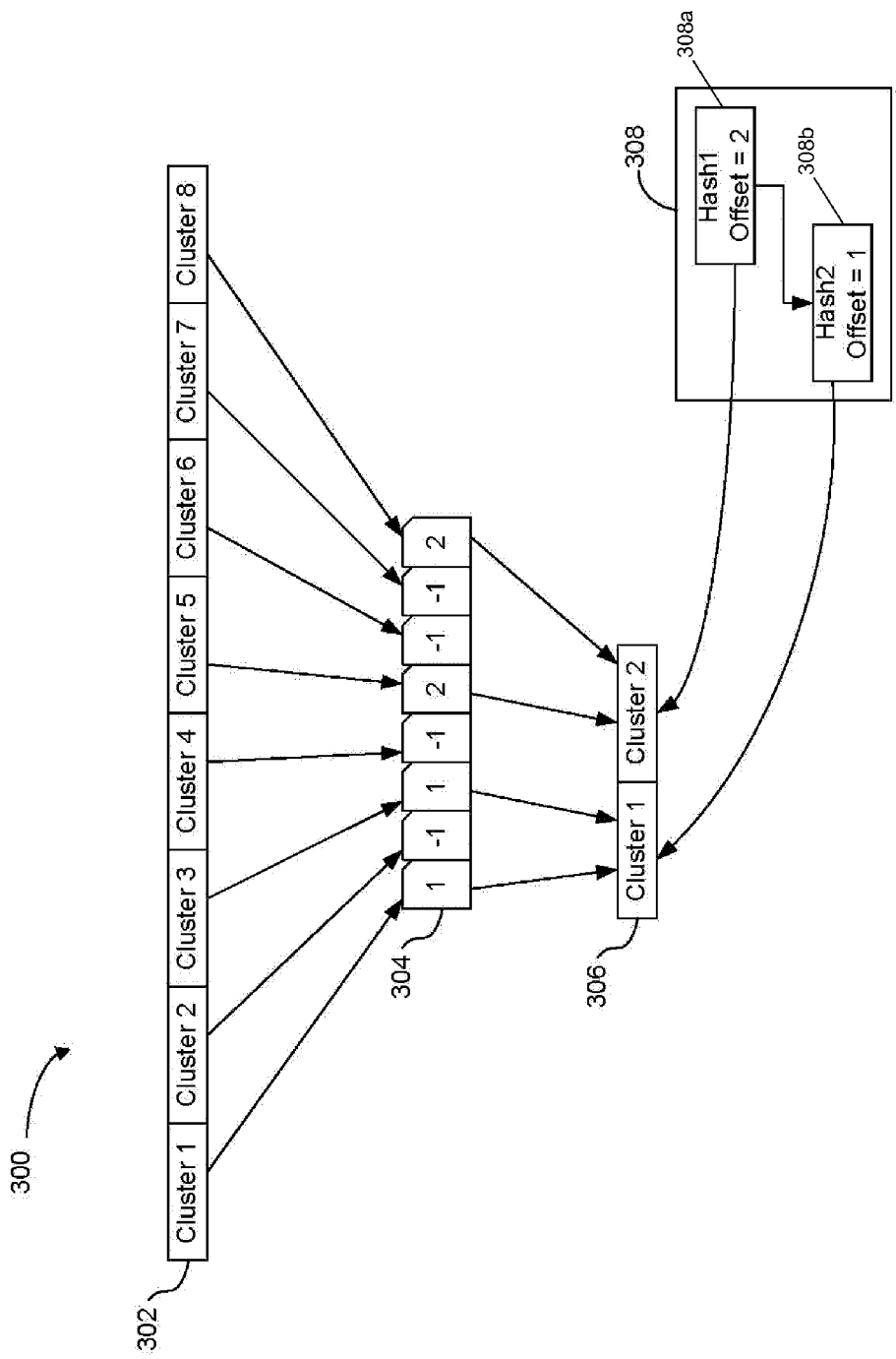
FIG. 3 illustrates an example of reduction of duplicate data by way of various implementations of the present invention.

FIG. 3 illustrates a second example 300 of reducing duplicate data by way of various implementations of the present invention. The data structures and processes included in the example 300 are illustrative of exemplary implementations and are not intended to be limiting. The example 300 depicts a snapshot 302 of a remote volume. The snapshot 302 may be received from one of the computing devices 102A-102N by the snapshot retrieval module 112. The snapshot 302 includes eight clusters (i.e., cluster 1-cluster 8). Assuming a volume size of 32 kilobytes, each of the eight clusters in the snapshot 302 have a size of 4 kilobytes. In the example 300, cluster 1, cluster 3, cluster 5 and cluster 8 of the snapshot 302 include useful data, and thus are considered valid clusters. Furthermore, clusters 1 and 3 are identical and clusters 5 and 8 are identical. The cluster identification module 114 may be executed to identify identical clusters such as by determining hash values for individual ones of valid clusters where valid clusters having identical hash values may be identified as duplicate clusters. The cluster identification module 114 may implement the B+ tree 308 (depicted as including elements 308a and 308b). Cluster 2, cluster 4, cluster 6, and cluster 7 do not include useful data, and thus are considered invalid clusters. The valid/invalid status of the individual clusters in the snapshot 202 may be assessed by the cluster identification module 114.

The mapping module 116 may be invoked to map the snapshot 302 into a map file 304. In the example 300, the map file 302 contains the same number of memory units (eight) as the number of clusters contained in the snapshot 302. The sequence of the clusters in the snapshot 302 may correspond to the sequence of the memory units of the map file 304. Each memory unit of the map file 304 includes an identifier corresponding to a cluster in the snapshot 302. The invalid clusters of the snapshot 302 (i.e., clusters 2, 4, 6, and 7) are assigned a static value of −1 (negative one). The valid clusters of the snapshot 302 are assigned incrementally increasing values along the map file 304. Since certain valid clusters are determined to be identical, through execution of the cluster identification module 114, clusters 1 and 3 correspond to an identifier value of 1, while clusters 5 and 8 correspond to an identifier value of 2.

The identifiers included in the map file 304 may be used as offset values by the backup module 118 while storing valid clusters of the snapshot 302 in a backup file 306. As such, cluster 1 and cluster 2 of the backup file 306 correspond, respectively, to clusters 1 and 3, and clusters 5 and 8 of the snapshot 302. The backup file 306 in the example 300 has a size of 8 kilobytes. The mapping module 116 may be utilized to reconstruct the remote volume associated with the snapshot 302 from the backup file 306 based on the map file 404.

Figure 4:
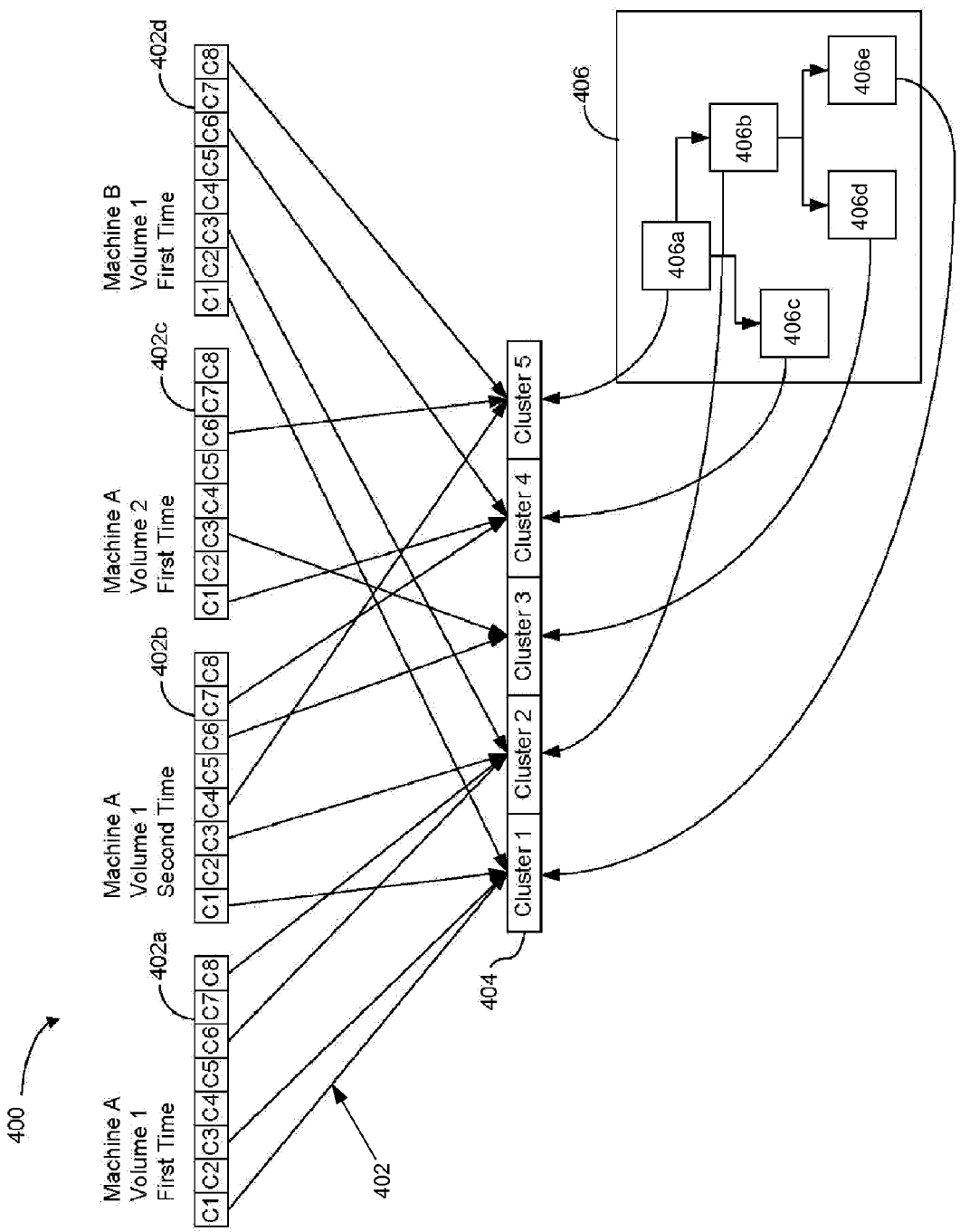
FIG. 4 illustrates an example of reducing duplicate data in accordance with various implementations of the present invention.

FIG. 4 illustrates a third example 400 of reducing duplicate data in accordance with various implementations of the present invention. The data structures and processes included in the example 400 are illustrative of exemplary implementations and are not intended to be limiting. The example 400 depicts snapshots of multiple remote volumes at multiple instants in time. More specifically, snapshot 402a is representative of volume 1 of machine A at one instant in time, while snapshot 402b is representative of volume 1 of machine A at a later instant in time. Snapshot 402c is representative of volume 2 of machine A at an instant in time and snapshot 402d is representative of volume 1 of machine B at an instant in time. The snapshots 402 (i.e., snapshots 402a, 402b, 402c, and 402d) may be received by the snapshot retrieval module 112. Each of the snapshots 402 includes eight clusters (i.e., C1-C8). Assuming a volume size of 32 kilobytes, each of the eight clusters in the snapshots 402 has a size of 4 kilobytes.

Through execution of the cluster identification module 114, valid clusters may be determined as clusters 1, 3, 6, and 8 of snapshot 402a; clusters 1, 3, 4, 6, and 7 of snapshot 402b; clusters 1, 3, and 6 of snapshot 402c; and clusters 1, 3, 6, and 8 of snapshot 402d. The cluster identification module 114 may be executed to determine unique and duplicate valid clusters. Although not depicted in FIG. 4, map files may be associated with each of the snapshots 402. In the example 400, clusters 1 and 3 of snapshot 402a, cluster 1 of snapshot 402b, and cluster 1 of snapshot 402d are identical, and thus are identified as duplicates of one another such that these clusters are mapped, via the mapping module 116, to cluster 1 of a backup file 404. Clusters 6 and 8 of snapshot 402a, cluster 3 of snapshot 402b, and cluster 3 of snapshot 402d are identical, and thus are identified as duplicates of one another such that these clusters are mapped, via the mapping module 116, to cluster 2 of a backup file 404. Cluster 6 of snapshot 402b and snapshot 3 of snapshot 402c are identical, and thus are identified as duplicates of one another such that these clusters are mapped, via the mapping module 116, to cluster 3 of a backup file 404. Cluster 7 of snapshot 402b, cluster 1 of snapshot 402c, and cluster 6 of snapshot 402d are identical, and thus are identified as duplicates of one another such that these clusters are mapped, via the mapping module 116, to cluster 4 of a backup file 404. Cluster 4 of snapshot 402b, cluster 6 of snapshot 402c, and cluster 8 of snapshot 402d are identical, and thus are identified as duplicates of one another such that these clusters are mapped, via the mapping module 116, to cluster 5 of a backup file 404. The cluster identification module 114 may be executed to identify identical clusters such as by determining hash values for individual ones of valid clusters where valid clusters having identical hash values may be identified as duplicate clusters. The cluster identification module 114 may implement a B+ tree 406 (depicted as including elements 406a, 406b, 406c, 406c, 406d, and 406e). The backup file 404 in the example 400 has a size of 20 kilobytes.

As time passes, clusters stored in the backup file 404 may become outdated, or otherwise no longer useful. These clusters may be purged from the backup file 404 through execution of the backup module 118. To avoid fragmentation of the backup file 404, the purged clusters may be used to store new data from individual ones of the snapshots 402 that has not been stored in the backup file 404. A purge file (not depicted) may be managed by the backup module 118 to track and/or re-use clusters in the backup file that are no longer valid and/or clusters in the backup file that have been purged. According to some implementations, the clusters tracked by the purge file may be continuously utilized to store valid clusters from one or more remote volumes included in the computing devices 102A-102N. As such, the backup file may be kept at a minimal or near-minimal length. This may prevent the backup file from becoming fragmented, which may lead to improved data retrieval times. The mapping module 116 may be utilized to reconstruct one or more remote volumes associated with the snapshots 402a-402d from the backup file 404 based on map files (not depicted) respectively associated with the snapshots 402a-402d.

Figure 5:
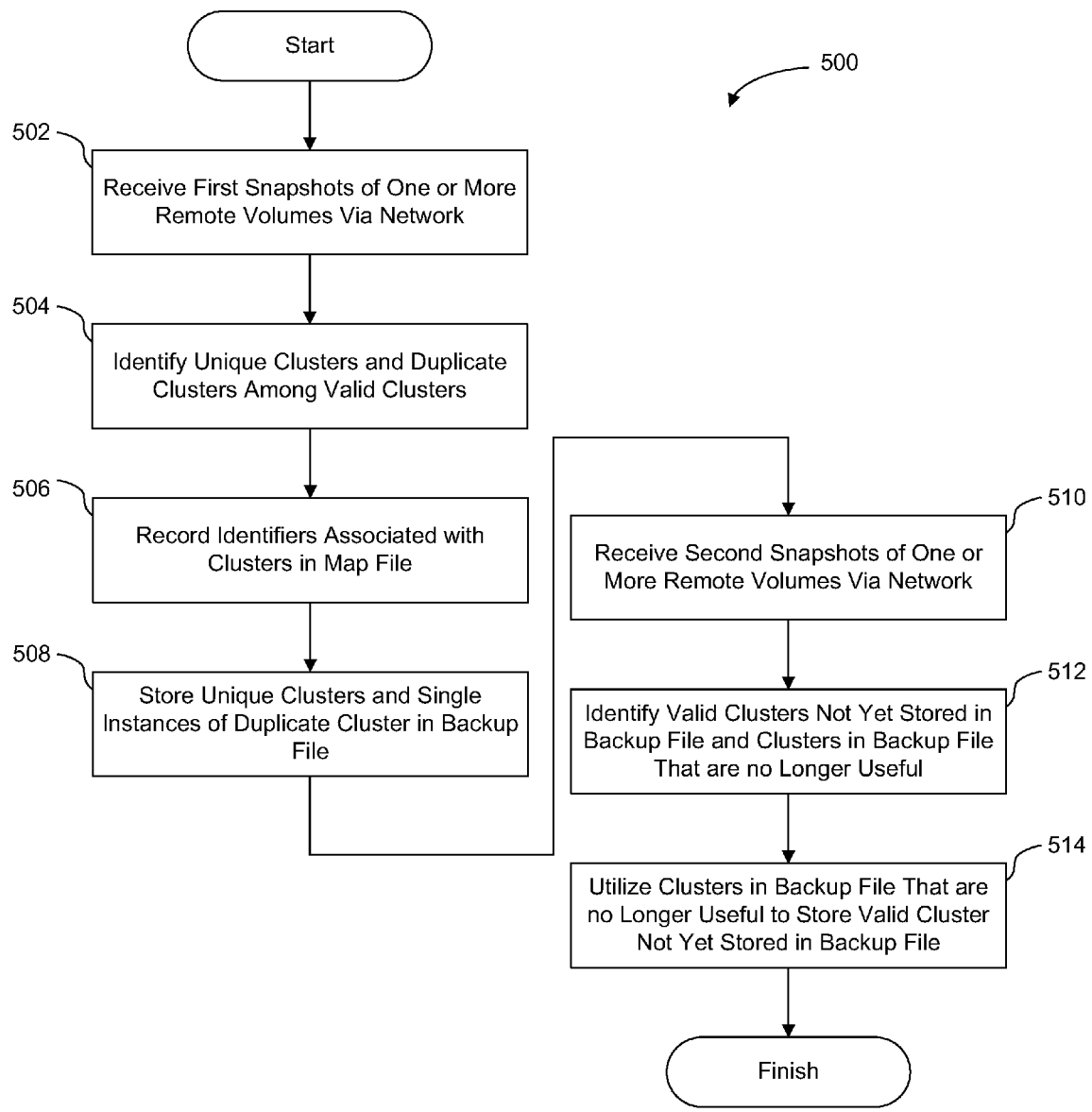
FIG. 5 illustrates an example of a method for reducing data duplication in cloud storage.

FIG. 5 illustrates an exemplary method 500 for reducing data duplication in cloud storage. The operations of the method 500 presented below are intended to be illustrative. In some implementations, the method 500 may be accomplished with one or more additional operations not described, and/or without one or more of the operations discussed. Additionally, the order in which the operations of the method 500 are illustrated in FIG. 2 and described below is not intended to be limiting.

In some implementations, the method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 200 in response to instructions stored electronically on an electronic storage medium. The one or more processing devices may include one or more devices configured through hardware, firmware, and/or software to be specifically designed for execution of one or more of the operations of the method 500.

At an operation 502, first snapshots of one or more remote volumes are received via a network. The first snapshots may be copies of the one or more remote volumes at a first instant in time. Individual ones of the one or more remote volumes may include a plurality of clusters. Individual ones of the plurality of clusters may be identified as valid or invalid, wherein valid clusters contain data to be backed up and invalid clusters are devoid of data to be backed up. The operation 502 may be performed by way of execution of the snapshot retrieval module 112.

At an operation 504, unique clusters and duplicate clusters are identified among the valid clusters. The duplicate clusters may be valid clusters in the one or remote volumes containing identical data. Duplicate clusters may be identified by determining hash values for individual ones of valid clusters where valid clusters having identical hash values may be identified as duplicate clusters. The operation 504 may be performed responsive to and/or based on the first snapshots. The cluster identification module 114 may be executed to perform the operation 504.

At an operation 506, identifiers associated with individual ones of the plurality of clusters included in the given remote volume may be recorded, such as in a map file associated with a given remote volume. The sequence of the identifiers in the map file may correspond to the sequence of the associated clusters in the given remote volume. Identifiers associated with valid clusters may be assigned incrementally increasing values along the map file. Identifiers associated with invalid clusters being assigned a static value. In some implementations, the map file may be updated responsive to identification of duplicate clusters such that identifiers in the map file that are associated with duplicate clusters are assigned the same value. The map file may be compressed. The mapping module 116 may be executed to perform the operation 506 in accordance with exemplary implementations.

At an operation 508, the unique clusters and single instances of the duplicate clusters are stored in a backup file such that the backup file is devoid of duplicate clusters. The operation 508 may be performed via execution of the backup module 118.

At an operation 510, second snapshots of the one or more remote volumes are received via the network. The second snapshots may be copies of the one or more remote volumes at a second instant in time. The second instant in time may be after the first instant in time. The snapshot retrieval module 112 may be executed to perform the operation 510.

At an operation 512, valid clusters in the one or more remote volumes not yet stored in the backup file and clusters in the backup file that are no longer valid are identified. Performance of the operation 512 may be responsive to and/ or based on the second snapshots. The cluster identification module 114 may be executed to perform the operation 512 in some implementations.

At an operation 514, the clusters in the backup file that are no longer valid or useful may be utilized to store the valid clusters in the one or more remote volumes that have not yet been stored in the backup file. The operation 514 may be performed responsive to the second snapshots and through execution of the backup module 118 in some implementations.

Although not depicted in FIG. 5, the method 500 may include further operations performed on snapshots received after the first and second snapshots. For example, the method 500 may further include receiving third snapshots of the one or more remote volumes via the network, the third snapshots being copies of the one or more remote volumes at a third instant in time, wherein the third instant in time is after the second instant in time. Responsive to and/or based on the third snapshots, valid clusters may be identified in the one or more remote volumes that have not yet been stored in the backup file as well as clusters in the backup file that are no longer valid. Responsive to the third snapshots, the clusters in the backup file that are no longer valid may be utilized to store the valid clusters in the one or more remote volumes not yet stored in the backup file.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A method to reduce data duplication in cloud storage, the method comprising:
    receiving a first snapshot of a remote volume via a network, the first snapshot including a copy of the remote volume at a first instant in time, the remote volume including a plurality of clusters, individual ones of the plurality of clusters being identified as valid or invalid, a valid cluster containing data to be backed up, and an invalid cluster being devoid of data to be backed up;
    identifying, responsive to and based on the first snapshot, unique clusters and duplicate clusters among the valid clusters, the duplicate clusters being valid clusters in the remote volume containing identical data;
    storing, in a backup file, the unique clusters and single instances of the duplicate clusters such that the backup file is devoid of duplicate clusters;
    receiving a second snapshot of the remote volume via the network, the second snapshot including a copy of the remote volume at a second instant in time, the second instant in time being after the first instant in time;
    identifying, responsive to and based on the second snapshot, a valid cluster in the remote volume not yet stored in the backup file and a cluster in the backup file that is no longer valid; and
    utilizing, responsive to the second snapshot, the cluster in the backup file that is no longer valid to store the valid cluster in the remote volume not yet stored in the backup file.

2. The method of claim 1, further comprising recording, in a map file associated the remote volume, identifiers associated with individual ones of the plurality of clusters included in the remote volume, the sequence of the identifiers in the map file corresponding to the sequence of the associated clusters in the remote volume, identifiers associated with valid clusters being assigned incrementally increasing values along the map file, and identifiers associated with invalid clusters being assigned a static value.

3. The method of claim 2, further comprising updating the map file responsive to identification of the duplicate clusters such that identifiers in the map file that are associated with duplicate clusters are assigned the same value.

4. The method of claim 2, further comprising compressing the map file.

5. The method of claim 2, wherein the map file associated with the remote volume has the same number of units as the number of clusters in the given remote volume.

6. The method of claim 1, wherein identifying the duplicate clusters based on the first snapshot includes determining hash values for individual ones of the valid clusters such that valid clusters having identical hash values are identified as duplicate clusters.

7. The method of claim 6, wherein a dynamic multilevel index is used to determine the hash values.

8. The method of claim 7, wherein the dynamic multilevel index is a B+ tree.

9. The method of claim 6, further comprising storing the hash values in an index file.

10. The method of claim 1, further comprising:
receiving a third snapshot of the remote volume via the network, the third snapshot including a copy of the remote volume at a third instant in time, the third instant in time being after the second instant in time;
identifying, responsive to and based on the third snapshot, a valid cluster in the remote volume not yet stored in the backup file and a cluster in the backup file that is no longer valid; and
utilizing, responsive to the third snapshot, the cluster in the backup file that is no longer valid to store the valid cluster in the remote volume not yet stored in the backup file.

11. The method of claim 1, further comprising managing a purge file configured to track clusters in the backup file that are no longer valid such that the clusters in the backup file that are no longer valid are available to store valid clusters from the remote volume.

12. A system to reduce data duplication in cloud storage, the system comprising:
a tangible processor configured to execute computer program modules, the computer program modules comprising:
a snapshot retrieval module configured to receive a first snapshot of a remote volume via a network, the first snapshot including a copy of the remote volume at a first instant in time, the remote volume including a plurality of clusters, individual ones of the plurality of clusters being identified as valid or invalid, an valid cluster containing data to be backed up, and an invalid cluster being devoid of data to be backed up;
a cluster identification module configured to identify, responsive to and based on the first snapshot, unique clusters and duplicate clusters among the valid clusters, the duplicate clusters being valid clusters in the remote volume containing identical data; and
a backup module configured to store, in a backup file, the unique clusters and single instances of the duplicate clusters such that the backup file is devoid of duplicate clusters;
wherein the snapshot retrieval module is further configured to receive a second snapshot of the remote volume via the network, the second snapshot including a copy of the remote volume at a second instant in time, the second instant in time being after the first instant in time;
wherein the cluster identification module is further configured to identify, responsive to and based on the second snapshot, a valid cluster in the remote volume not yet stored in the backup file and a cluster in the backup file that is no longer valid; and
wherein the backup module is further configured to utilize, responsive to the second snapshot, the cluster in the backup file that is no longer valid to store the valid cluster in the remote volume not yet stored in the backup file.

13. The system of claim 12, wherein the computer program modules further comprise a mapping module configured to record, in a map file associated with the remote volume, identifiers associated with individual ones of the plurality of clusters included in the remote volume, the sequence of the identifiers in the map file corresponding to the sequence of the associated clusters in the remote volume, identifiers associated with valid clusters being assigned incrementally increasing values along the map file, and identifiers associated with invalid clusters being assigned a static value.

14. The system of claim 13, wherein the mapping module is further configured to update the map file responsive to identification of the duplicate clusters such that identifiers in the map file that are associated with duplicate clusters are assigned the same value.

15. The system of claim 13, wherein the mapping module is further configured to compress the map file.

16. The system of claim 13, wherein the map file associated with the remote volume has the same number of units as the number of clusters in the remote volume.

17. The system of claim 12, wherein the cluster identification module is configured to identify the duplicate clusters based on the first snapshot by determining hash values for individual ones of the valid clusters such that valid clusters having identical hash values are identified as duplicate clusters.

18. The system of claim 17, wherein the cluster identification module utilizes a dynamic multilevel index to determine the hash values.

19. The system of claim 18, wherein the dynamic multilevel index is a B+ tree.

20. The system of claim 17, wherein the cluster identification module is further configured to store the hash values in an index file.

21. The system of claim 12, wherein the backup module is further configured to manage a purge file configured to track clusters in the backup file that are no longer valid such that the clusters in the backup file that are no longer valid are available to store valid clusters from the remote volume.

22. The system of claim 12, wherein the snapshot retrieval module is further configured to receive a third snapshot of the remote volume via the network, the third snapshot including a copy of the remote volume at a third instant in time, the third instant in time being after the second instant in time;
wherein the cluster identification module is further configured to identify, responsive to and based on the third snapshot, a valid cluster in the remote volume not yet stored in the backup file and a cluster in the backup file that is no longer valid; and wherein the backup module is further configured to utilize, responsive to the third snapshot, the cluster in the backup file that is no longer valid to store the valid cluster in the remote volume not yet stored in the backup file.

* * * * *